United States Patent
Darrow, Jr. et al.

(10) Patent No.: US 10,189,564 B2
(45) Date of Patent: Jan. 29, 2019

(54) NON-LOADED MANUAL BLADE FOLD ASSEMBLY

(71) Applicant: Sikorsky Aircraft Corporation, Stratford, CT (US)

(72) Inventors: David A. Darrow, Jr., Stratford, CT (US); Frank P. D'Anna, Seymour, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 342 days.

(21) Appl. No.: 14/915,139

(22) PCT Filed: Mar. 27, 2014

(86) PCT No.: PCT/US2014/031938
§ 371 (c)(1),
(2) Date: Feb. 26, 2016

(87) PCT Pub. No.: WO2015/030873
PCT Pub. Date: Mar. 5, 2015

(65) Prior Publication Data
US 2016/0207622 A1    Jul. 21, 2016

Related U.S. Application Data

(60) Provisional application No. 61/871,074, filed on Aug. 28, 2013.

(51) Int. Cl.
*B64C 27/50* (2006.01)
*B64C 27/10* (2006.01)

(52) U.S. Cl.
CPC .............. *B64C 27/50* (2013.01); *B64C 27/10* (2013.01)

(58) Field of Classification Search
CPC ......... B64C 27/50; B64C 27/10; B64C 27/48; B64C 27/46; B64C 11/28; B64C 3/56;
(Continued)

(56) References Cited

U.S. PATENT DOCUMENTS 3,277,767 A    10/1966   Allen et al.
3,331,444 A    7/1967    Toner
(Continued)

OTHER PUBLICATIONS

International Search Report, International Application No. PCT/US2014/031938, dated Sep. 22, 2014, pp. 1-5.
(Continued)

*Primary Examiner* — Logan Kraft
*Assistant Examiner* — Justin A Pruitt
(74) *Attorney, Agent, or Firm* — Cantor Colburn LLP (57) ABSTRACT

A pin configured for use in a rotor blade movable between an aligned position and a folded position and having a rotor blade airfoil contour is provided including a cylindrical body configured to couple a first section and a second section of the rotor blade when the rotor blade is in the aligned position. A handle is mounted to an end of the cylindrical body and has an airfoil contour complementary to the rotor blade airfoil contour. The handle is movable between an open position and a closed position. When the handle is in the closed position, the handle is flush with an adjacent portion of the rotor blade. When the handle is in the open position, the handle is accessible to pull the cylindrical body from the first and second section s of the rotor blade.

14 Claims, 7 Drawing Sheets

(58) Field of Classification Search
CPC ............. B64C 27/022; B64C 2201/102; Y10T
24/44026; F16B 19/00; F16B 19/02;
F16B 2021/14; F16B 21/16
USPC .......................................................... 416/143
See application file for complete search history.

(56) References Cited

U.S. PATENT DOCUMENTS

| | | | |
|---|---|---|---|
| 4,014,484 | A | 3/1977 | Mouille |
| 4,712,978 | A | 12/1987 | Tiemann |
| 4,738,592 | A | 4/1988 | Cavanaugh |
| 4,997,218 | A | 3/1991 | Culling |
| 5,249,926 | A | 10/1993 | D'Anna et al. |
| 6,752,596 | B2 | 6/2004 | Mondet et al. |
| 6,783,327 | B1 | 8/2004 | Davis |
| 7,210,651 | B2 | 5/2007 | Scott |
| 7,857,590 | B1 | 12/2010 | Neal |
| 2004/0026564 | A1 | 2/2004 | Romani et al. |
| 2004/0118970 | A1 | 6/2004 | Muylaert et al. |
| 2006/0147309 | A1 | 7/2006 | Munsch |
| 2007/0215749 | A1 | 9/2007 | Miner et al. |
| 2008/0112808 | A1 | 5/2008 | Schmaling et al. |
| 2009/0084891 | A1 | 4/2009 | Darrow, Jr. et al. |
| 2009/0097973 | A1 | 4/2009 | Cabrera et al. |
| 2011/0156413 | A1 | 6/2011 | Teuthorn |
| 2012/0025012 | A1 | 2/2012 | Arlton et al. |
| 2012/0175461 | A1 | 7/2012 | Van der Westhuizen et al. |
| 2015/0225076 | A1 | 8/2015 | Lawrence |
| 2016/0214711 | A1 | 7/2016 | Darrow, Jr. et al. |

OTHER PUBLICATIONS

International Search Report, International Application No. PCT/US2014/031943, dated Sep. 11, 2014, pp. 1-20.
Written Opinion of the International Searching Authority, International Application No. PCT/US2014/031938, dated Sep. 22, 2014, pp. 1-6.
Written Opinion of the International Searching Authority, International Application No. PCT/US2014/031943, dated Sep. 11, 2014, pp. 1-6.
EP Communication; Extended European Search Report; Application No. 14839405.9-1754/3038903 PCT/US2014031943; dated Apr. 5, 2017; pp. 1-8.
EP Communication; Extended European Search Report; Application No. 14840568.1-1754/3038910 PCT/US2014031938; dated May 11, 2017; pp. 1-8.
PCT International Preliminary Report on Patentability; International Application No. PCT/US2014/031938; International Filing Date: Mar. 27, 2014; dated Mar. 1, 2016; pp. 1-7.
PCT International Preliminary Report on Patentability; International Application No. PCT/US2014/031943; International Filing Date: Mar. 27, 2014; dated Mar. 1, 2016; pp. 1-7.

NON-LOADED MANUAL BLADE FOLD ASSEMBLY

CROSS-REFERENCE TO RELATED APPLICATION

This application claims the benefit of U.S. provisional patent application Ser. No. 61/871,074 filed Aug. 28, 2013, the entire contents of which are incorporated herein by reference.

STATEMENT REGARDING FEDERALLY SPONSORED RESEARCH OR DEVELOPMENT

This invention was made with Government support under Technology Investment Agreement No. W911W6-13-2-0003 with the United States Army. The Government has certain rights in the invention.

BACKGROUND OF THE INVENTION

Exemplary embodiments of the invention relate to a blade fold assembly for a rotary wing aircraft, and more particularly, to a handle for operating a blade fold system.

The flight capabilities of rotary-wing aircrafts make them effective for a wide variety of missions; however, operation of rotary-wing aircraft in certain environments may be limited by the overall structural envelopes thereof. The radial dimensions of a rotary-wing aircraft main rotor assembly results in a rotary-wing aircraft having relatively large structural envelopes which may impact its utility in some environments. For example, space on a ship or vessel is generally at a premium and the structural envelope of a rotary wing aircraft may require a significant allocation of such limited space. Furthermore, strategic and tactical considerations in the military utilization of rotary-wing aircrafts has led to a requirement for rotary-wing aircrafts having main rotor assemblies that may be readily reconfigured for rapid deployment, routine transport, and/or stowage by reducing the structural envelope.

One way to reduce the structural envelope of rotary-wing aircraft to facilitate rapid deployment, routine transport, stowage, and reduce the vulnerability thereof to environmental conditions is to design the main rotor assembly so that the main rotor blades fold relative to the main rotor hub. However, conventional blade folding systems are cumbersome and are susceptible to drag, thereby decreasing the efficiency of the rotary wing aircraft in flight.

BRIEF DESCRIPTION OF THE INVENTION

According to one embodiment of the invention, A pin configured for use in a rotor blade movable between an aligned position and a folded position and having a rotor blade airfoil contour is provided including a cylindrical body configured to couple a first section and a second section of the rotor blade when the rotor blade is in the aligned position. A handle is mounted to an end of the cylindrical body and has an airfoil contour complementary to the rotor blade airfoil contour. The handle is movable between an open position and a closed position. When the handle is in the closed position, the handle is flush with an adjacent portion of the rotor blade. When the handle is in the open position, the handle is accessible to pull the cylindrical body from the first and second sections of the rotor blade.

In addition to one or more of the features described above, or as an alternative, in further embodiments the cylindrical body is configured to extend through an aligned first opening in the first section and a second opening in the second section.

In addition to one or more of the features described above, or as an alternative, in further embodiments the handle is positioned adjacent at least one fairing of the rotor blade and the handle has an airfoil contour complementary to the airfoil contour of the at least one fairing.

In addition to one or more of the features described above, or as an alternative, in further embodiments the locking device is configured to retain the handle in the closed position.

In addition to one or more of the features described above, or as an alternative, in further embodiments upon removal of the locking device, a biasing mechanism is configured to bias the handle from the closed position to the open position.

According to another embodiment of the invention, a rotor blade is provided including a first section and a second section. The first section includes a first connector having at least one first opening. The second section includes a second connector having at least one second opening. The second section is rotatably coupled to the first section and is configured to rotate between an aligned position and a rotated position. The first section and the second section have a generally complementary rotor blade airfoil contour. At least one pin is configured to extend through an aligned first opening and second opening when the second section is in the aligned position. The pin includes a cylindrical body and a handle mounted to an end of the cylindrical body. The handle is movable between an open position and a closed position. The handle has an airfoil contour generally complementary to the rotor blade airfoil contour such that when the handle is in the closed position, the handle is substantially flush with the adjacent first section and second section. When the handle is in an open position, the handle is accessible to pull the cylindrical body from the first and second sections of the rotor blade.

In addition to one or more of the features described above, or as an alternative, in further embodiments the first section includes a blade retention fairing and the second section includes a blade root fairing.

In addition to one or more of the features described above, or as an alternative, in further embodiments the airfoil contour of a first end of the blade retention fairing and the airfoil contour of an adjacent first end of the blade root fairing are generally complementary.

In addition to one or more of the features described above, or as an alternative, in further embodiments when the second section is in the aligned position, a space exists between a portion of the first end of the blade retention fairing and a portion of the first end of the blade root fairing.

In addition to one or more of the features described above, or as an alternative, in further embodiments the space extends from adjacent the aligned first opening and second opening to an outer edge of the blade retention fairing and blade root fairing.

In addition to one or more of the features described above, or as an alternative, in further embodiments the first connector includes a generally parallel first upper arm and a first lower arm. The at least one first opening extends through both the first upper arm and the first lower arm.

In addition to one or more of the features described above, or as an alternative, in further embodiments the second connector includes a generally parallel second upper arm and second lower arm. The at least one second opening extends through both the second upper arm and the second lower arm.

In addition to one or more of the features described above, or as an alternative, in further embodiments a locking device is configured to retain the handle in the closed position.

In addition to one or more of the features described above, or as an alternative, in further embodiments upon removal of the locking device, a biasing mechanism is configured to bias the handle from the closed position to the open position.

Technical effects include a folding system for a rotor blade including handles having a shape complementary to an airfoil contour of the rotor blade.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
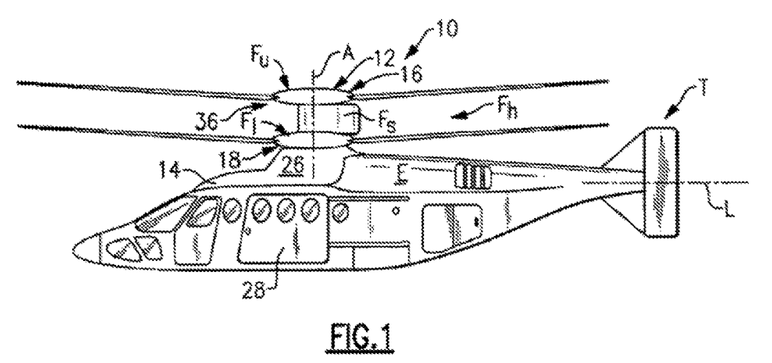
FIG. 1 is a side view of an example of a rotary wing aircraft.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system T which provides translational thrust generally parallel to an aircraft longitudinal axis L. Although a particular aircraft configuration is illustrated in the disclosed embodiment, other counter-rotating, coaxial rotor systems and non-coaxial rotor systems will also benefit from the present invention.

A main gearbox 26 which may be located above the aircraft cabin drives the rotor system 12. The translational thrust system T may be driven by the same main gearbox 26 which drives the rotor system 12. The main gearbox 26 is driven by one or more engines (illustrated schematically at E). As shown, the main gearbox 26 may be interposed between the gas turbine engines E, the rotor system 12 and the translational thrust system T.

Figure 2:
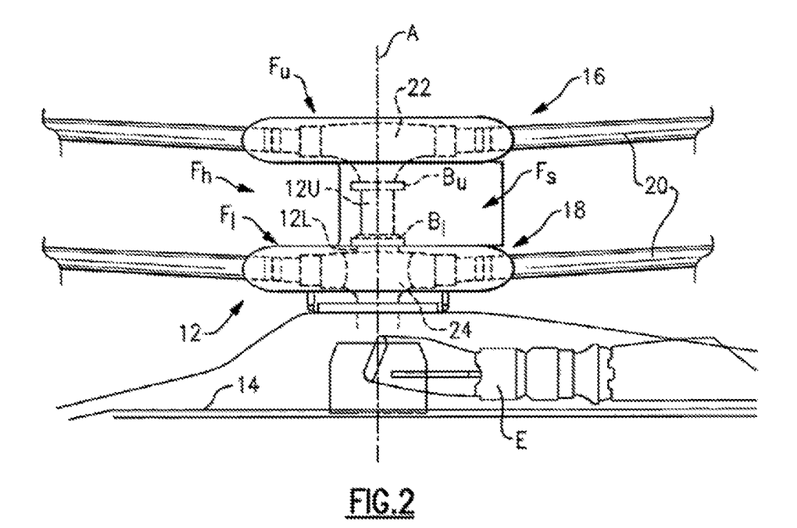
FIG. 2 is an cross-sectional view of a main rotor system of the aircraft illustrated in FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22,24 for rotation about a rotor axis of rotation A. A plurality of the main rotor blade assemblies 20 project radially outward from the hub assemblies 22, 24. Any number of main rotor blade assemblies 20 may be used with the rotor system 12.

While not required in all aspects, the shown rotor system 12 also includes a rotor hub fairing system Fh generally located between and around the upper and lower rotor systems 16, 18 such that the rotor hub assemblies 22, 24 are at least partially contained therein. The rotor hub fairing system Fh preferably includes an upper hub fairing Fu, a lower hub fairing Fl and a shaft fairing Fs therebetween. The shaft fairing Fs is preferably attached to the counter-rotating, coaxial rotor system 12 through a bearing arrangement Bu, Bl such that the shaft fairing Fs is aligned with the relative wind in forward flight but may be free to pivot during low speed maneuvering. The upper bearing Bu and the lower bearing Bl are respectively located adjacent an upper portion and a lower portion of the shaft fairing Fs. The upper bearing Bu is preferably attached to one rotor shaft 12U while the lower bearing Bl attached to the other rotor shaft 12L such that the bearings counter-rotate and net bearing drag is relatively low.

Figure 3:
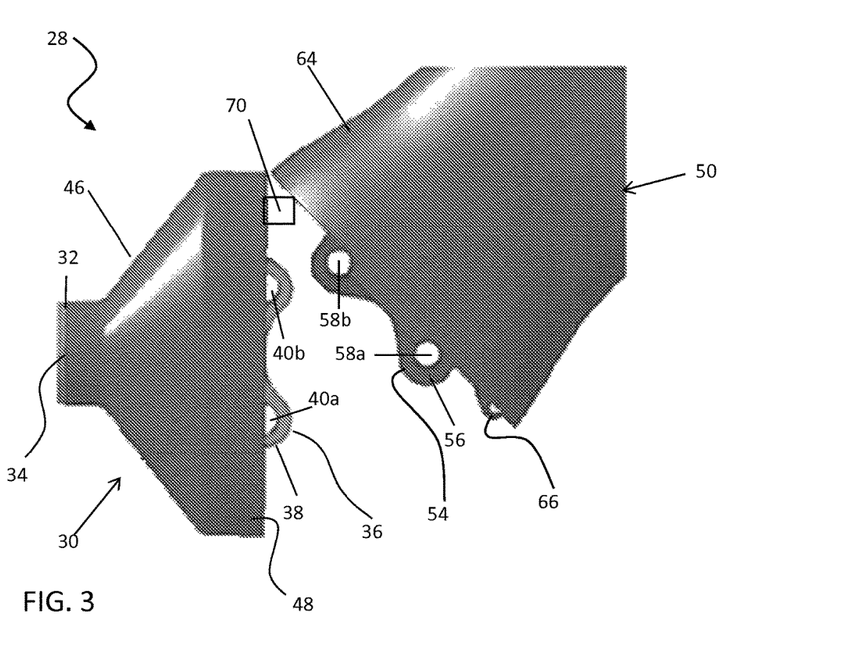
FIG. 3 is a top view of a portion of a rotor blade of the main rotor system according to an embodiment of the invention.
Figure 4:
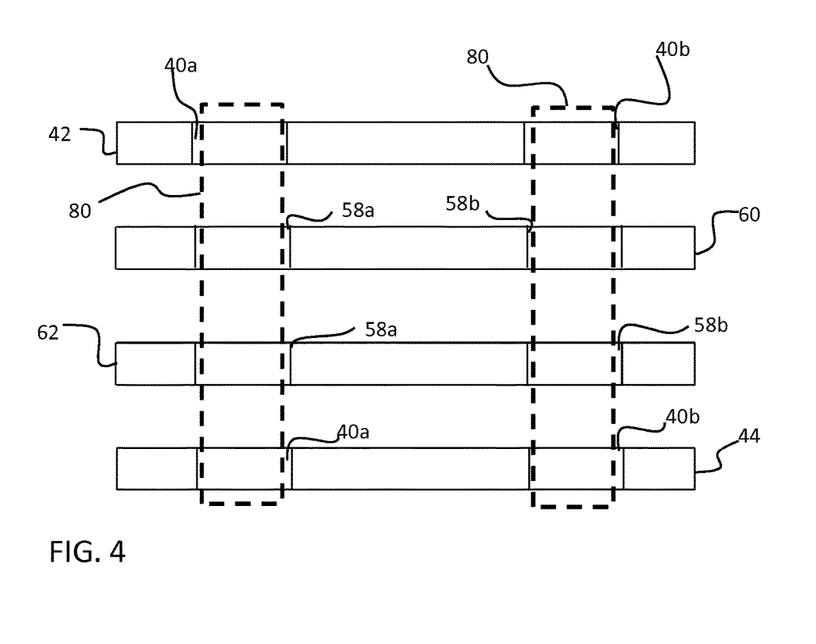
FIG. 4 is a cross-sectional view of the first and second connectors of a rotor blade in an aligned position according to an embodiment of the invention.
Figure 5:
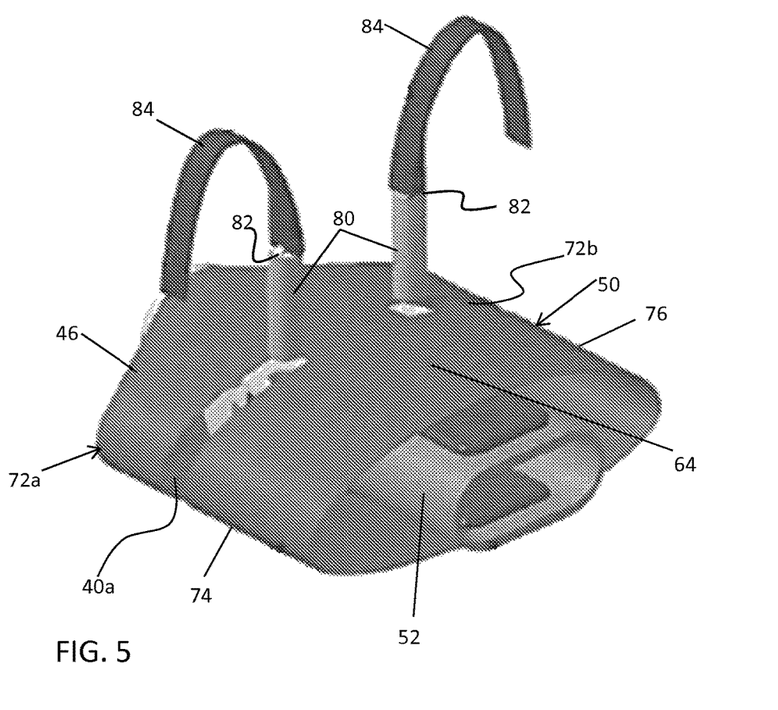
FIG. 5 is a perspective view of a portion of a rotor blade in an aligned position having handles in an open position according to an embodiment of the invention.

Referring now to FIGS. 3-5, at least one of the rotor blade assemblies 20 includes a rotor blade 28 configured to fold about a fold axis X (FIG. 2), generally perpendicular to the blade chord at or near the fold axis X. The rotor blade 20 is divided into a first section 30 and a complementary second section 50. The first section 30 includes an attachment member or spindle 32, a first end 34 of which is mounted to a rotor hub, such as rotor hub 22 or 24 for example, such that the attachment member 32 extends radially outward from the hub. The second end 36 of the attachment member 32 includes a first connector 38 having at least one opening 40. In the illustrated, non-limiting embodiment, the first connector 38 includes a first opening 40a and an adjacent second opening 40b. The plurality of openings 40 may, but need not be, substantially similar in size and shape. The first connector 38 may resemble a clevis including an upper arm 42 and a lower arm 44 such that each opening 40 of the first connector 38 includes a pair of generally vertically aligned openings (FIG. 4). The first section 30 of the rotor blade 28 also includes a blade retention fairing 46 having an airfoil contour that generally surrounds the attachment member 32. A portion of the first connector 38 including the at least one opening 40 is positioned beyond a first end 48 of the blade retention fairing 46.

The second section 50 of the rotor blade 28 includes a blade spar 52 (best shown in FIG. 5) having a second connector 56 coupled to or integrally formed with the end 54 of the blade spar 52 adjacent the first section 30. The second connector 56 also includes at least one opening 58 complementary to an opening 40 of the first connector 38. In one embodiment, the plurality of openings 58 of the second connector 56 is substantially equal to the plurality of openings 40 of the first connector 40. In addition, the second connector 56 may resemble a clevis having an upper arm 60 and a lower arm 62 such that each opening 58 formed in the second connector 56 includes a vertically aligned first opening and second opening as shown in FIG. 4, although it is understood that the openings need not be vertically aligned in all aspects. As shown in FIG. 4, the openings 40a, 40b are formed in upper arm 42 and lower arm 44 of the first connector 38, and the openings 58a, 58b are formed in upper arm 60 and lower arm 62 of the second connector 56. However, the specific overlap and numbers of arms is not limited to the shown number and orientation in other aspects of the invention.

A blade root fairing 64 having an airfoil contour surrounds a portion of the blade spar 52 of the second section 50. The openings 58 formed within the second connector 56 extend beyond a first end 66 of the blade root fairing 64. While not required in all aspects, the second connector 56 extends from the spar 52, and the first connector 38 extends from a spar (not shown) of the first section 30. A linkage 70, illustrated schematically in FIG. 3, couples the blade spar 52 to the attachment member 32, such that the second section 50 is configured to rotate to a desired angle about the blade fold axis X from an aligned position (FIG. 5) to a rotated position (FIG. 3). When the second section 50 is in the generally aligned position relative to the first section 30, the first connector 38 and the second connector 56 are arranged in an overlapping arrangement. Pins 80 are inserted into the openings 40a, 58a, 40b, 58b and are represented by the dashed lines in FIG. 4. In embodiments where both the first connector 38 and the second connector 56 are formed as a clevis, as shown in FIG. 4, the upper and lower arms 60, 62 of one of the connectors, such as the second connector 56 for example, may be positioned between the upper and lower arms 42, 44 of the other connector, such as the first connector 38. Alternatively, the upper and lower arms 42, 44, 60, 62 of both connectors 38, 56 may be interposed and need not be equal in number in all aspects such as where arms 42 and 44 are used with arm 60 only. Further, while shown with two sets of openings, the number of openings is not limited thereto and may be increased or decreased according to the types of pins 80 and loadings anticipated.

The airfoil contour of the first end 48 of the blade root fairing 46 is generally complementary to the airfoil contour at the adjacent end 66 of the blade retention fairing 64. When the second section 50 is generally aligned with the first section 30, a space 72 exists between at least one portion of the blade retention fairing 46 and the adjacent blade root fairing 64. In the illustrated, non-limiting embodiment shown in FIG. 5, a first space 72a exists adjacent to a first set of aligned openings 40a, 58a and extends from the aligned first openings 40a, 58a to an outer edge 74. Similarly, a second space 72b exists adjacent a second set of aligned openings 40b, 58b and extends from the second openings 40b, 58b to an opposite outer edge 76. The spaces 72 may be uniform or may vary from adjacent the openings 40, 58 to an outer edge 74, 76 of the fairings 46, 64. Each space 72 is at least equal in size to the adjacent openings 40, 58 to receive the pin configured to fit therein.

When the first and second sections 30, 50 of the rotor blade 28 are aligned, a generally cylindrical pin 80 may be inserted within each set of aligned openings 40, 58 to couple the first and second connectors 38, 56. Once the pins 80 are inserted, rotation of the second section 50 relative to the first section 30 may be limited, or blocked entirely.

Figure 6:
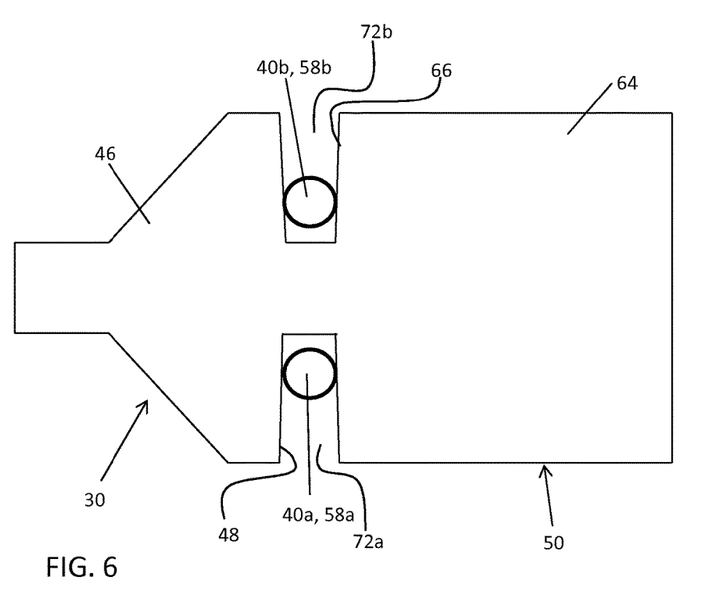
FIG. 6 is a top view of a portion of a rotor blade in an aligned position according to an embodiment of the invention.
Figure 7:
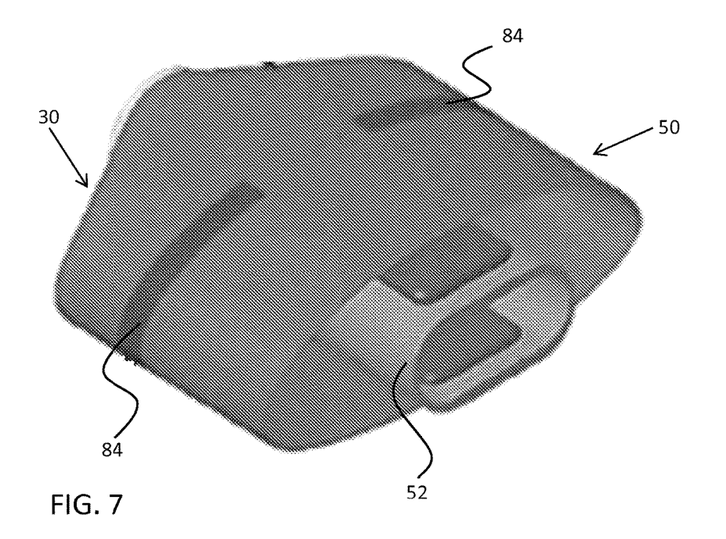
FIG. 7 is a perspective view of a portion of a rotor blade in an aligned position having handles in a closed position according to an embodiment of the invention.

Connected to an end 82 of each cylindrical pin 80 is a U-shaped handle 84 configured to pivot between an open position (FIG. 5) and a closed position (FIG. 6). The handles 84 may be formed from a metal material, such as stainless steel or titanium for example. When each handle 84 is in the closed position, the handle 84 is arranged within the space 72 between the blade retention fairing 46 and the blade root fairing 64. The U-shape of the handle 84 is generally complementary to the airfoil contour of the blade retention fairing 46 and the blade end fairing 64 such that when the handle 84 is in the closed position, the handle 84 is substantially flush with the adjacent fairings 46, 64. This creates a connection between the second section spar 52 and a spindle of the first section 30.

Figure 8:
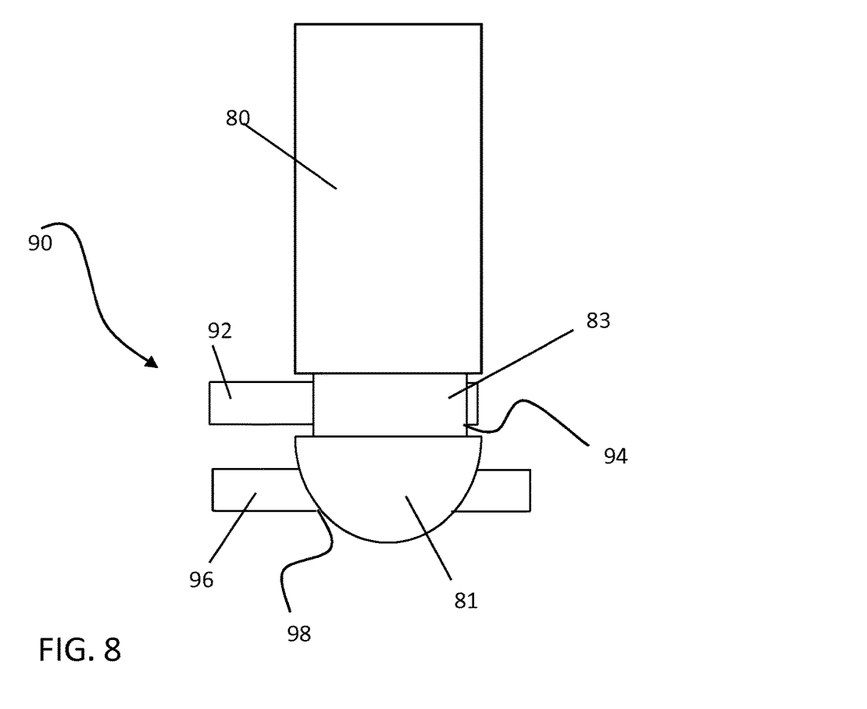
FIG. 8 is a side view of a locking device configured to retain the handles of the rotor blade in a closed position according to an embodiment of the invention.

A locking device 90, illustrated in FIG. 8 and generally known in the art, is configured to prevent the unintentional removal of one or more of the cylindrical pins 80 from a set of aligned openings 40, 58, such as during operation of the rotary wing aircraft 10 for example. The locking device 90, such as integrally formed with the second end 86 of the handle 84 for example, includes a forked plate 92 having a U-shaped slot 94 dimensioned to engage a groove 83 formed about the circumference of the pin 80 near end 81. An adjacent flap 96 includes an opening 98 similarly dimensioned to facilitate to facilitate force fitting the flap onto the second end 81 of the cylindrical pin 80. Together the forked plate 92 and the flap 96 retain the pin 80 and handle 84 in the closed position.

By adapting the handle 84 to fit within the space 72 and have a contour complementary to the airfoil of the fairings 46, 64, the drag of the rotor blade 28 is reduced while reliably locking the rotor blade 28 about the blade folding axis X.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, while shown as being relatively close to the rotor hub, the opening 72 between the first and second sections 30 and 50 could be farther outboard from what is shown. Additionally, while various embodiments of the invention have been described, it is to be understood that aspects of the invention may include only some of the described embodiments. By way of example, aspects could be used in fixed wing aircraft, but the invention is not limited to aircraft. Accordingly, the invention is not to be seen as limited by the foregoing description, but is only limited by the scope of the appended claims.

What is claimed is:

1. A pin configured for use in a rotor blade movable between an aligned position and a folded position and having a rotor blade airfoil contour, comprising:
    a cylindrical body configured to couple a first section and a second of the rotor blade, when the rotor blade is in the aligned position; and
    a handle mounted to an end of the cylindrical body and having an airfoil contour generally complementary to the rotor blade airfoil contour, the handle being movable between an open position and a closed position, wherein when the handle is in the closed position, the handle is flush with an adjacent portion of the rotor blade, and when the handle is in the open position, the handle is accessible to pull the cylindrical body from the first and second sections of the rotor blade.

2. The pin according to claim 1, wherein the cylindrical body is configured to extend through an aligned first opening in the first section and a second opening in the second section.

3. The pin according to claim 1, wherein the handle is positioned adjacent at least one fairing of the rotor blade, and the handle has an airfoil contour complementary to the airfoil contour of the at least one fairing.

4. The pin according to claim 1, wherein a locking device is configured to retain the handle in the closed position.

5. The pin according to claim 4, wherein upon removal of the locking device, a biasing mechanism is configured to bias the handle from the closed position to the open position.

6. A rotor blade comprising:
- a first section configured to mount to a rotor hub, the first section including a first connector having at least one first opening;
- a second section including a second connector having at least one second opening, the second section being rotatably coupled to the first section and configured to rotate between an aligned position and a rotated position, the first section and the second section having a generally complementary rotor blade airfoil contour; and
- at least one pin configured to extend through an aligned first opening and second opening when the second section is in the aligned position, the pin including:
- a cylindrical body; and
- a handle mounted to an end of the cylindrical body and having an airfoil contour generally complementary to the rotor blade airfoil contour, the handle being movable between an open position and a closed position, wherein when the handle is in the closed position, the handle is flush with an adjacent portion of the first section and the second section, and when the handle is in the open position, the handle is accessible to pull the cylindrical body from the first and second sections of the rotor blade.

7. The rotor blade according to claim 6, wherein the first section includes a blade retention fairing and the second section includes a blade root fairing.

8. The rotor blade according to claim 7, wherein the airfoil contour of a first end of the blade retention fairing and the airfoil contour of an adjacent first end of the blade root fairing are generally complementary.

9. The rotor blade according to claim 8, wherein when the second section is in the aligned position, a space exists between a portion of the first end of the blade retention fairing and a portion of the first end of the blade root fairing.

10. The rotor blade according to claim 9, wherein the space extends from adjacent the aligned first opening and second opening to an outer edge of the blade retention fairing and blade root fairing.

11. The rotor blade according to claim 6, wherein the first connector includes a generally parallel first upper arm and a first lower arm, and the at least one first opening extends through both the first upper arm and the first lower arm.

12. The rotor blade according to claim 11, wherein the second connector includes a generally parallel second upper arm and second lower arm, and the at least one second opening extends through both the second upper arm and the second lower arm.

13. The rotor blade according to claim 6, wherein a locking device is configured to retain the handle in the closed position.

14. The rotor blade according to claim 13, wherein upon removal of the locking device, a biasing mechanism is configured to bias the handle from the closed position to the open position.

* * * * *